May 24, 1938.  F. C. BIGGERT, JR  2,118,028

UNIVERSAL COUPLING

Filed May 20, 1935

WITNESSES
A B Wallace
J E Dickinson

INVENTOR.
Florence C. Biggert Jr
BY Brown, Critchlow & Flick
his ATTORNEYS.

Patented May 24, 1938

2,118,028

UNITED STATES PATENT OFFICE 2,118,028

UNIVERSAL COUPLING

Florence C. Biggert, Jr., Crafton, Pa., assignor to United Engineering & Foundry Company, Pittsburgh, Pa., a corporation of Pennsylvania Application May 20, 1935, Serial No. 22,320

11 Claims. (Cl. 64—6)

This invention pertains to a universal coupling, and, while it has been designed for use more particularly in rolling mill drives, it is equally well adapted for general use in connecting together any rotary members which are subject to disalignment in operation.

An object of the invention is to provide a coupling of this character which comprises a small number of parts, is simple and sturdy of construction, easy to both assemble and disassemble and in which the load is so distributed that the parts will not readily wear out.

Another object is to provide a universal coupling which permits, without binding, a wide range of disalignment of the shafts to which it is connected, which is free of loose play and particularly adapted for effective lubrication.

Figure 1:
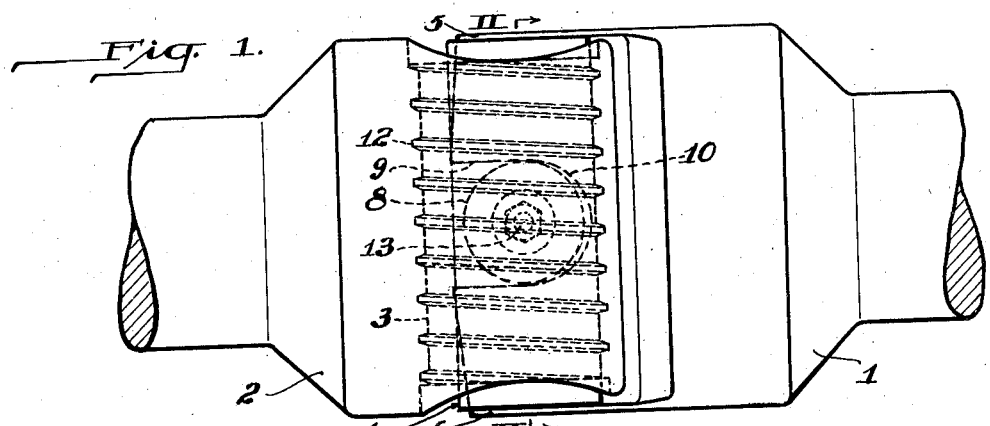
Figure 2:
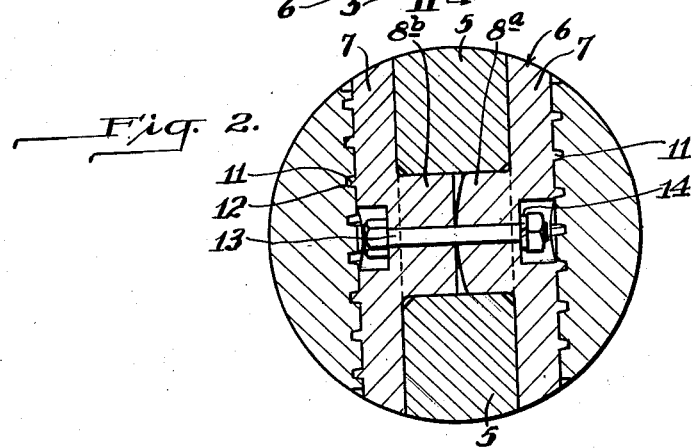
Figure 3:
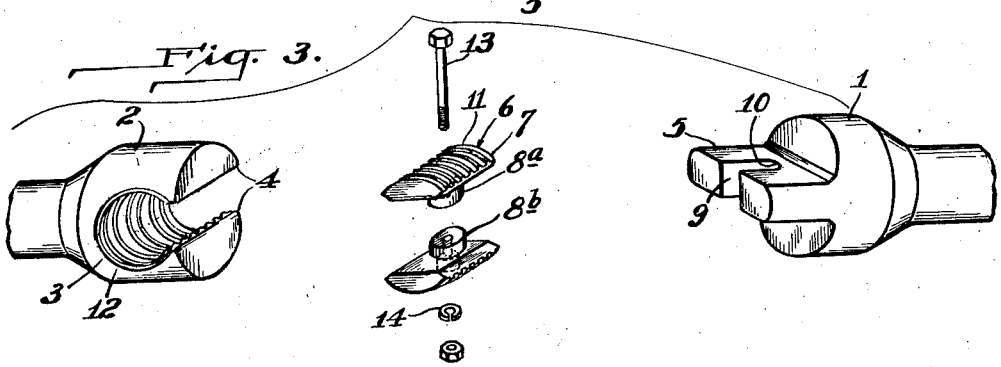

These and various other objects, as well as the various other novel features and advantages of the invention, will be apparent when the following detailed description is read in conjunction with the accompanying drawing, of which Fig. 1 is a side elevation of a coupling embodying the invention; Fig. 2 a sectional view taken on the line II—II of Fig. 1; Fig. 3 an exploded view of the coupling in the perspective; and Fig. 4 a view of a modified form of the slipper element employed in it.

Referring in detail to the embodiment of the invention illustrated in the drawing, the numerals 1 and 2 designate, respectively, the cooperating male and female heads of the coupling. These are made either integral with or suitably attached to the ends of the shafts, spindles or whatever elements they are associated with. In the female head there is provided adjacent the exposed face thereof a transversely extending cylindrical bore 3 which is disposed to communicate with an opening or slot 4 extending across the width of the head opposite the axis of the bore.

Within this opening 4 and bore 3, when the coupling is assembled, a flat diametrically extending tongue-like projection 5, provided on the adjacent face of the male head 1, is engaged. To hold such tongue in place and also eliminate play in the coupling, while at the same time providing it with the necessary universal movement, a bushing or slipper element 6 is provided and mounted for rotary movement in the bore 3, the latter being made cylindrical to permit such movement. This slipper, which is in the nature of a bushing, is preferably made of bronze or other suitable bushing material and comprises essentially a pair of diametrically opposed cylindrical sections 7 having a length equal to the length of the bore 3, and spaced sufficiently apart by a centrally disposed pin or trunnion 8 to maintain their convex surfaces in contact with the surface of the bore 3 and their inner surfaces, which are flat, just far enough apart to receive the tongue 5 on the male coupling member. To hold the tongue 5 in place it is provided with an axially disposed slot 9 which straddles the pin 8. This slot permits relative endwise movement of the two heads, as well as facilitates the coupling assembly, and to permit the tongue to pivot freely in the plane thereof about the pin 8 its inner end 10 is rounded with a curvature of the same radius as that of the pin.

To hold the slipper itself against endwise movement so that it will not slide out of the bore 3, it is provided on the periphery of its segmental section 7 with spaced helically arranged ribs or threads 11, and the surface of the bore 3 with corresponding rib or thread-receiving grooves 12 in which these ribs are disposed to fit, and through the aid of which the slipper is adapted to be fitted into the female head from the end of the bore by a simple threading operation. When the coupling is operating at an angle the slippers are necessarily rotated a slight amount relative to the female head, and while such relative rotary movement will produce slight axial displacement of the slipper it will be unimportant in the uses contemplated and may be held within permissible limits by selecting a suitable pitch of the threads or ribs. To prevent the slipper 6 from sliding through the slot 4 in the end of the female head and to also facilitate the guiding of its threads in the grooves of the bore 3 the segmental sections are made with a width greater than the width of such slot so that they completely span such slot when they are being screwed into the bore 3.

Figure 4:
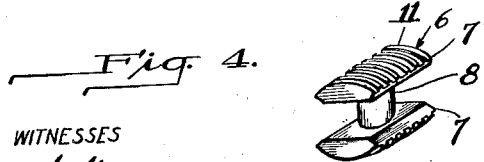

While it may be made in one integral piece, as illustrated in Fig. 4, the slipper 6 may also be divided into two or more parts, as shown more particularly in Figs. 2 and 3, with a part of the pin 8 attached to each and these two parts joined together by a bolt 13. To permit a slight canting of the segmental sections so as to facilitate their entry into the bore 3, and to also permit them to be moved relative to each other sufficiently, in the event they do not seat smoothly against the bore 3, and to prevent their end projections being broken off by the pressure exerted upon them by the tongue 5, the end of the pin portion 8a on one of the segments is bevelled to provide a rocking contact with the pin portion 8b on the other segment, which may be flat, and a lock washer 14 is provided on the connecting bolt 13 which has enough give in it to allow the necessary movement between the slipper elements for this purpose.

To assemble the coupling, the slipper is threaded into the bore 3 of the female coupling head until it is all the way in place, and the flat inner surfaces thereof are in parallel alignment with the axis of the head. The tongue 5 on the male head 1 is then fitted, through the opening 4 in the female head 2, into the slipper 6 with its centrally disposed slot 9 straddling the pin 8. When so assembled the tongue 5 on the male head 1 prevents the slipper 6 from being turned beyond the angle permitted by the slot 4 and the ribs or threads 12 which may be provided either on the slipper or in the surface of the bore 3 prevent the slipper from sliding out of the bore while pin 8 holds the tongue 5 in place. These threads also prevent any part which may break away from the segmental sections 7 from flying out of the coupling while in operation.

Another advantage of the threads 11 is that they assist in holding the lubricant for the coupling on the surfaces of the contacting faces between the slipper and the bore. The lubrication, of course, may be supplied to the face of the elements in any suitable manner.

To prevent any binding between the ribs or threads 11 of the slipper and the grooves 12 of the bore, they are preferably provided with sufficient clearance so that all the radial pressure exerted on the slipper will be carried by the major surfaces of the bore and slipper between the threads and grooves.

As will be obvious from the foregoing, the disassembling of the coupling is effected by simply removing the tongue 5 of the male head from the slot 4 in the female head 2 and then turning the slipper until it is unscrewed from the bore 3. As will be obvious also the locking of the tongue 5 against lateral movement in the slipper may be otherwise accomplished than as shown and of course the slipper may be readily replaced by a new one when it becomes worn.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A universal coupling comprising a female member provided with a transversely extending cylindrical bore communicating with an opening in the free end of said member, a slipper mounted for rotation in said bore and held therein by threaded engagement therewith, and a male member provided with a tongue which is inserted in said opening and pivotally engaged in said slipper.

2. A universal coupling comprising a female member provided with a transversely extending cylindrical bore communicating with an opening in the free end of said member, a male member provided with a tongue which is projected through said opening into said bore, a slipper rotatably mounted in said bore to receive said tongue and hold it against lateral displacement therein, and means in the nature of threads and grooves in and on the contacting surfaces of said slipper and bore for inserting and retaining the slipper in the bore.

3. A universal coupling comprising a female member provided with a transversely extending cylindrical bore communicating with an opening in the free end of said member, a non-collapsible slipper rotatably mounted in said bore and retained therein by threaded engagement therewith, and a male member provided with a tongue which is inserted through said opening and pivotally engaged in said slipper.

4. A universal coupling comprising a female member provided with a transversely extending cylindrical bore communicating with an opening in the end of said member of less width than the diameter of said bore, a slipper consisting of a central segment of a cylinder threadably engaged for free rotating movement in said bore and provided with a width greater than the width of said opening, and a male member provided with a tongue which is inserted through said opening and engaged in said slipper for pivotal movement in the plane of said tongue.

5. A universal coupling comprising a female member provided with a transverse cylindrical bore communicating with an opening in one end of said member, a removable slipper consisting of opposite segments of a cylinder threadably but freely rotatably mounted in said bore and permanently spaced apart by an integral portion forming a cylindrical bearing means whose axis is transverse to the axis of said slipper, and a male member provided with a slotted tongue which is inserted in said opening and between the segments of the slipper with said slot straddling said cylindrical bearing means.

6. A universal coupling according to claim 5 in which the slipper is divided into two parts at a point intermediate the cylindrical segments and in which the end of the cylindrical bearing means attached to one segment is bevelled to permit relative movement of said segments.

7. A universal coupling according to claim 5 in which the slipper is divided into two parts at a point intermediate the cylindrical segments and these joined together in such a way as to permit relative movement of the segments by a bolt extended through the cylindrical bearing means.

8. A universal coupling according to claim 5 in which the slipper is divided into two parts at a point intermediate the cylindrical segments and these joined together in such a way as to permit relative movement of the segments, and one of the contacting ends of the cylindrical bearing means between the segments provided with a bevelled surface to facilitate said relative movement of the cylindrical segments.

9. A universal coupling comprising a female coupling head having in it a transversely extending cylindrical bore which intersects its free end and provides a transverse opening therein, a slipper element consisting of a pair of segmental cylindrical sections separated by spacing means and rotatably mounted in said bore, co-operating helically disposed ribs and grooves on and in the surfaces of said slipper and bore for positioning and retaining said slipper in said bore, and a male coupling head provided with a transversely projecting tongue slidably positioned in the opening in said female head between the segmental cylindrical slipper sections and held against lateral displacement by the means separating said sections.

10. A universal coupling comprising a female coupling member having a transversely extending cylindrical bore therein adjacent its free end and communicating with a transverse slot in said end extending in axial alignment therewith, a slipper element consisting of a pair of diametrically opposed segmental cylindrical sections mounted for rotation in said bore and separated by means holding their convex surfaces in contact with the surface of said bore, a male coupling member provided with a transverse tongue on its exposed face fitted between the inner surfaces of said slipper sections and pivotally held thereby, and cooperating helically disposed ribs and grooves in and on the contacting surfaces of said bore and slipper elements for inserting and retaining said slipper in said bore.

11. For use in a universal coupling, a bearing slipper consisting of opposed cylindrical segments, means comprising a bearing element permanently spacing said segments apart and contacting surfaces between said segments and said element permitting canting of said segments to facilitate the insertion of the slipper into the coupling.

FLORENCE C. BIGGERT, JR.